(12) United States Patent
Berglin et al.

(10) Patent No.: US 7,571,846 B2
(45) Date of Patent: Aug. 11, 2009

(54) CARTON BLANK FOR DIRECT INJECTION MOLDED CLOSURES

(75) Inventors: Terry B. Berglin, North Maple Grove, MN (US); John N. Lees, Golden Valley, MN (US)

(73) Assignee: Tetra Laval Holdings & Finance, S.A., Pully (CH)

( * ) Notice: Subject to any disclaimer, the term of this patent is extended or adjusted under 35 U.S.C. 154(b) by 622 days.

(21) Appl. No.: 10/894,767

(22) Filed: Jul. 20, 2004

(65) Prior Publication Data

US 2006/0016865 A1      Jan. 26, 2006

(51) Int. Cl.
B65D 43/14      (2006.01)
B29C 70/78      (2006.01)
(52) U.S. Cl. ............................ 229/125.15; 229/125.04; 229/900; 264/257; 264/268; 425/110
(58) Field of Classification Search ............ 229/125.04, 229/125.15, 125.42, 137, 213, 214, 249, 229/900; 53/133.2, 488; 425/110
See application file for complete search history.

(56) References Cited

U.S. PATENT DOCUMENTS 1,994,923 A * 3/1935 Ross ........................... 229/137
2,025,477 A * 12/1935 Scott ...................... 229/125.42
3,349,988 A * 10/1967 Horning ...................... 229/249

(Continued)

FOREIGN PATENT DOCUMENTS

JP      62211117      9/1987

(Continued)

OTHER PUBLICATIONS

International Search Report for PCT/US2005/020589, Nov. 11, 2005.

*Primary Examiner*—Gary E Elkins
(74) *Attorney, Agent, or Firm*—Levenfeld Pearlstein, LLC (57)      ABSTRACT

A carton blank is used in a form, fill and seal machine on which a closure is directly molded onto the carton. The molding portion of the machine includes a tool set having first and second tool elements in which the first tool element has an aligning member extending therefrom in a direction transverse to a direction of loading the carton between the first and second tool elements. The aligning element has a predetermined shape having diverging surfaces. The carton blank includes a rear wall panel, a first side wall panel, a front wall panel and a second side wall panel. Each panel is separated from its adjacent panels by a vertical score line. A closure panel is adjacent the front wall panel, has an opening therein and is configured for having a closure molded thereon. The closure panel is partitioned from the front wall panel by a first horizontal score line. The closure panel has a closure panel fin panel extending from a side opposite the front wall panel. The closure panel fin panel has a height measured to an edge of the fin panel. A first upper side panel is adjacent the first side wall panel and is adjacent the closure panel. The first upper side panel has a first upper side panel fin panel having a height. The closure panel fin panel has a cut-out formed therein. The cut-out has converging edges having a shape complementary to the first tool element aligning member and configured to mate with the first tool element aligning member to laterally align the carton with the first tool.

14 Claims, 4 Drawing Sheets

U.S. PATENT DOCUMENTS

| | | | | |
|---|---|---|---|---|
| 3,770,185 A | * | 11/1973 | Reeves | 229/213 |
| 4,568,018 A | * | 2/1986 | Husnik | 229/249 |
| 4,725,213 A | * | 2/1988 | Reil et al. | 425/117 |
| 4,813,546 A | * | 3/1989 | Gordon et al. | 229/214 |
| 4,834,241 A | * | 5/1989 | Southern | 229/249 |
| 4,964,562 A | * | 10/1990 | Gordon | 229/125.15 |
| 5,304,265 A | * | 4/1994 | Keeler | 156/64 |
| 5,427,310 A | * | 6/1995 | Testa, Jr. | 229/249 |
| 5,503,327 A | * | 4/1996 | Barnes | 229/125.42 |
| 5,704,541 A | * | 1/1998 | Mogard | 229/125.15 |
| 6,253,994 B1 | * | 7/2001 | Mogard | 229/125.15 |
| 6,303,066 B1 | | 10/2001 | Gustaffsson et al. | |
| 6,321,813 B1 | * | 11/2001 | Miyajima et al. | 53/133.2 |
| 6,328,204 B1 | * | 12/2001 | Stacy-Ryan | 229/137 |
| 6,948,923 B2 | * | 9/2005 | Lees et al. | 425/112 |
| 7,032,363 B1 | * | 4/2006 | Annehed et al. | 53/133.2 |
| 2004/0145084 A1 | * | 7/2004 | Chapplear et al. | 264/328.1 |

FOREIGN PATENT DOCUMENTS

WO     WO 2004050326     6/2004

* cited by examiner

CARTON BLANK FOR DIRECT INJECTION MOLDED CLOSURES

BACKGROUND OF THE INVENTION

This invention pertains to a carton blank. More particularly, this invention pertains to a carton blank adapted for directly injection molding a closure onto the carton blank.

Consumers have come to recognize and appreciate resealable closures for containers to store, for example, liquid food products and the like. These resealable closures permit ready access to the product while providing the ability to reseal the container to prolong the life and freshness of the product. Typically, the containers or cartons are formed from a composite of paperboard material having one or more polymer coatings or layers to establish a liquid impervious structure.

In conventional packages (also referred to as cartons or containers) the closures, which are formed in a separate process and transported to the packaging process, are subsequently affixed to the cartons as part of the overall form, fill and seal operation. Typically, the closures are affixed to the partially erected carton prior to filling the carton with product.

Recently, in order to avoid the additional steps of transporting, handling and affixing the closures to the cartons, containers and processes have been developed in which closures are formed directly on the carton. That is, the closure is formed, for example, by injection molding, directly onto the carton material. In such an arrangement, a mold tool is closed over the carton (having an open area around which the closure is formed). The tool includes internal and external tool portions that are positioned at the interior and exterior regions of the carton, respectively to define a mold cavity. Plastic is then injected into the space between the internal and external tool portions to form the closure. Such an arrangement is disclosed in Lees et al., U.S. Pat. Nos. 6,467,238 and 6,536,187, which patents are commonly assigned with the present application and are incorporated herein by reference. Such an arrangement is also disclosed in copending U.S. patent application Ser. No. 10/894,759 entitled, Molding Unit for Forming Direct Injection Molded Closures, filed on even date herewith.

It has however been found that in order to properly form the closure, it is necessary to precisely position or locate the carton blank between the mold tools both longitudinally and laterally. Even the slightest of misplacement in either the longitudinal or lateral directions can result in an improperly formed or incompletely formed closure. Such a closure renders the carton unusable.

Accordingly, there exists a need for a carton and molding system for directly molding resealable closures onto the carton. Such a carton and molding system include a straightforward configuration to assure that the carton is properly aligned (longitudinally and laterally) within the molding system for plastic injection.

BRIEF SUMMARY OF THE INVENTION

A carton blank is configured for having a direct injection molded closure formed thereon. Such a carton blank is used in a form, fill and seal packaging machine for forming, filling and sealing the carton. A molding unit or mold portion of the machine is configured to mold the closure directly onto the carton. Such a machine includes a tool set having first and second tool elements.

The first tool element has an aligning member extending therefrom in a direction transverse to a direction of loading the carton between the first and second tool elements. The aligning member has a predetermined shape. In one form, the aligning member is a projection having diverging surfaces.

The carton blank includes a rear wall panel, a first side wall panel, a front wall panel and a second side wall panel. Each panel is separated from its adjacent panels by a vertical score line.

A closure panel is adjacent the front wall panel. The closure panel is partitioned from the front wall panel by a first horizontal score line. The closure panel has a closure panel fin panel extending from a side opposite the front wall panel. The closure panel fin panel has a height measured to an edge of the fin panel. The closure panel is configured for having a closure molded thereon.

A first upper side panel is adjacent the first side wall panel. The upper side panel is adjacent the closure panel and has a first upper side panel fin panel having a height.

The closure panel fin panel has a cut-out formed therein. The cut-out has a shape complementary to the first tool element aligning member and is configured to mate with the first tool element aligning member. As such, the cut-out has converging edges to mate with the aligning member. In this manner, the carton blank laterally aligns with the first tool to assure proper position of the carton for molding the closure on the carton. In a present blank, the cut-out has a depth that is less than a difference between the closure panel fin panel height and the first upper side panel fin panel height. The blank can have a plurality of cut-outs (e.g., two cut-outs) formed therein. Each cut-out is configured to mate with an aligning member on the internal tool.

Alternately, the carton can have a tab formed therein that cooperates with a notch formed in (in lieu of a projection extending from) the stop surface.

In one form, the cut-out has opposing converging sides or edges and a base portion inward of the edge of the fin panel. In such a manner, the carton is urged into alignment on the internal tool when the cut-out engages the aligning member. The cut-out can be formed having straight converging, meeting sides that define a V-shaped profile. Alternately, the cutout can have a straight base portion extending between the sides. In such an arrangement, the base portion is preferably parallel to the edge of the fin panel.

The cut-out or cut-outs can be laterally off-center of the fin panel, or laterally centered on the fin panel. When two cut-outs are used they can be positioned in mirror image relation to one another relative to a longitudinal centerline through the closure panel.

A present blank is formed such that the second side wall panel is adjacent the front wall panel, on a side opposite the first side wall panel and the rear wall panel is adjacent the second side wall panel, opposite the front wall panel. The blank includes a sealing panel adjacent the first side wall panel, opposite the front wall panel.

Other features and advantages of the present invention will be apparent from the following detailed description, the accompanying drawings, and the appended claims.

BRIEF DESCRIPTION OF THE SEVERAL VIEWS OF THE DRAWINGS

The benefits and advantages of the present invention will become more readily apparent to those of ordinary skill in the relevant art after reviewing the following detailed description and accompanying drawings, wherein.

DETAILED DESCRIPTION OF THE INVENTION

While the present invention is susceptible of embodiment in various forms, there is shown in the drawings and will hereinafter be described a presently preferred embodiment with the understanding that the present disclosure is to be considered an exemplification of the invention and is not intended to limit the invention to the specific embodiment illustrated.

It should be further understood that the title of this section of this specification, namely, "Detailed Description Of The Invention", relates to a requirement of the United States Patent Office, and does not imply, nor should be inferred to limit the subject matter disclosed herein.

In the present disclosure, the words "a" or "an" are to be taken to include both the singular and the plural. Conversely, any reference to plural items shall, where appropriate, include the singular.

Figure 1A:
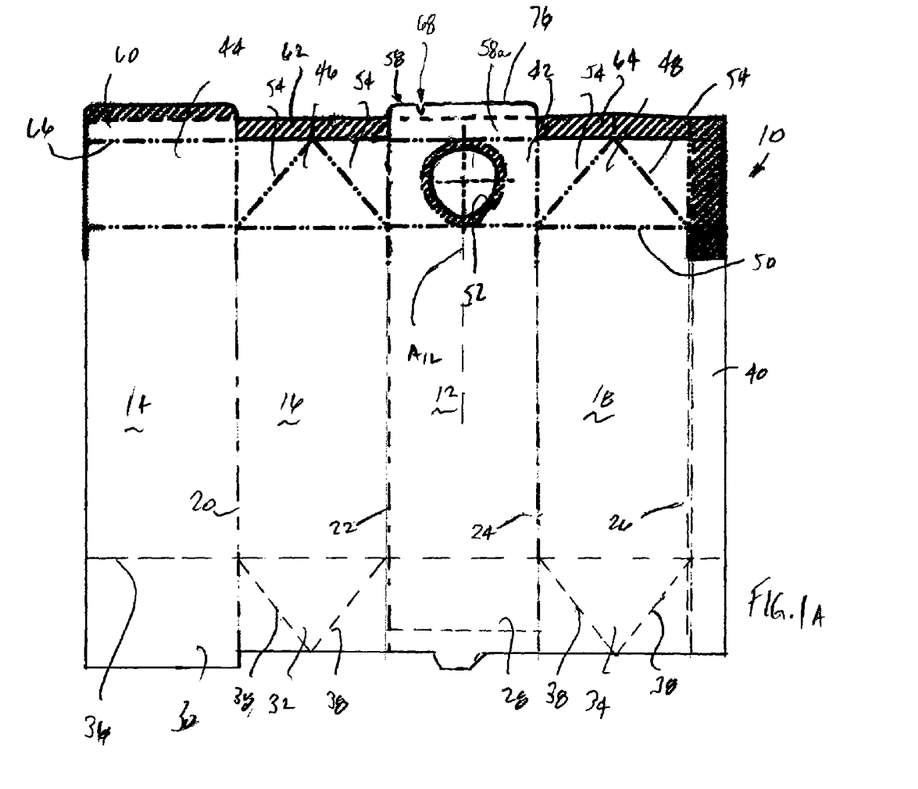
FIG. 1A is a plan view of a carton blank configured for having a direct injection molded closure formed thereon and having an aligning cut-out in accordance with the principles of the present invention.
Figure 1B:
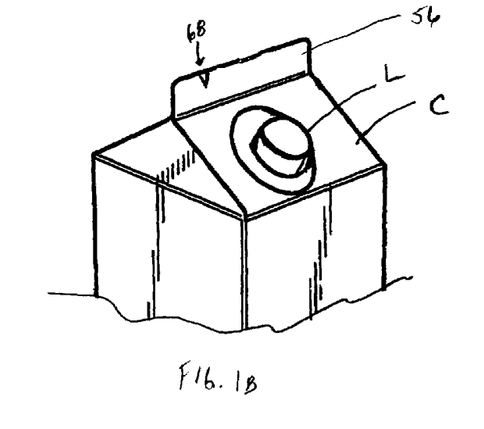
FIG. 1B is a perspective view of a carton formed form a blank embodying the principles of the present invention, the carton having a closure formed thereon.

Referring now to the figures in particular to FIG. 1 there is shown one embodiment of a carton blank 10 in accordance with the principles of the present invention. The blank 10 includes a plurality of panels 12, 14, 16, 18 that correspond to the front wall, rear wall and side walls (first side wall panel and second side wall panel) of an erected carton C (FIG. 1B). The panels 12, 14, 16, 18 are partitioned from one another by a plurality of vertical score lines 20, 22, 24, 26. A plurality of corresponding bottom panels 28, 30, 32, 34 are partitioned from the corresponding front, side and rear wall panels by a lower horizontal score line 36. A plurality of lower diagonal score lines 38 further define bottom panels for folding purposes. A sealing panel 40 is adjacent to second side wall panel 18 for sealing to the rear wall panel 14.

Each the front, rear and side wall panels 12, 14, 16, 18 includes a top panel 42, 44, 46, 48. The top panels 42, 44, 46, 48 are partitioned from their respective wall panels 12, 14, 16, 18 by an upper horizontal score line 50. The front top panel 42 includes an aperture 52 that is configured as the carton opening and around which the closure is formed. The side top panels 46, 48 are further partitioned by slanted score lines 54 (to form triangular top panels) to form the sides of the familiar gable top.

The top fin 56 of the package C (see FIG. 1B) is formed by a plurality of fin panels 58, 60, 62, 64 (see FIG. 1A). The fin panels 58, 60, 62, 64 are partitioned from their corresponding top panels 42, 44, 46, 48 by a top horizontal score line 66. Fin panel 58 is separated from its corresponding top panel 42 by the top horizontal score line 66. The front and rear wall panel fin panels 58, 60 have a greater height $h_{58}$ than the side wall fin panels $h_{62}$.

Front (closure) panel fin panel 58 includes a cut-out formation 68 therein. The cut-out formation 68 has opposing non-parallel edges 70, 72 that are oriented toward (converge) one another. The illustrated cut-out 68 includes a pair of opposing inwardly oriented edges that terminate at a base 74 forming a V-shape. In a preferred carton blank 10, the cut-out 68 is formed in the fin 58 corresponding to the panel 42 in which the opening 52 is formed. As illustrated, the cut-out 68 is off-centered relative to panels 12, 42, 58 (see, for example panel 12 axis $A_{12}$).

Figure 1C:
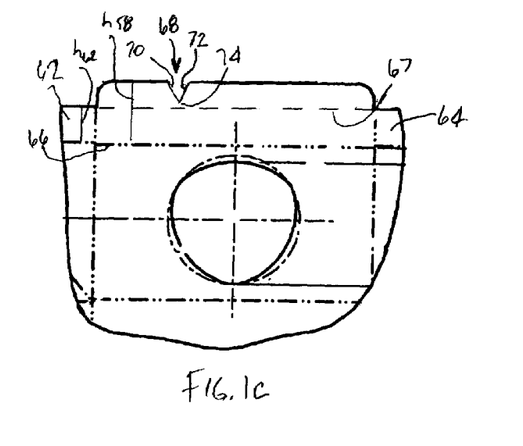
FIG. 1C is an enlarged view of the closure panel of the blank of FIG. 1A.

It will be appreciated that the cut-out 68 is formed in the fin panel 58 such that the base 74 of the cut-out 68 does not extend so far as top horizontal score line 66, and preferably not as far as the height of adjacent panels 62, 64 ($h_{62}$), as indicated by the phantom line 67 in FIG. 1C. In this manner, when the carton C is sealed, with fin panels 58 and 60 sealed to one another (with fin panels 62 and 64 therebetween), the portion 58a of fin panel 58 below the cut-out 68 is sealed to fin panels 60, 62, 64. In such a configuration, the integrity of the seal is maintained, even with the reduced material available for sealing.

Figure 6A:
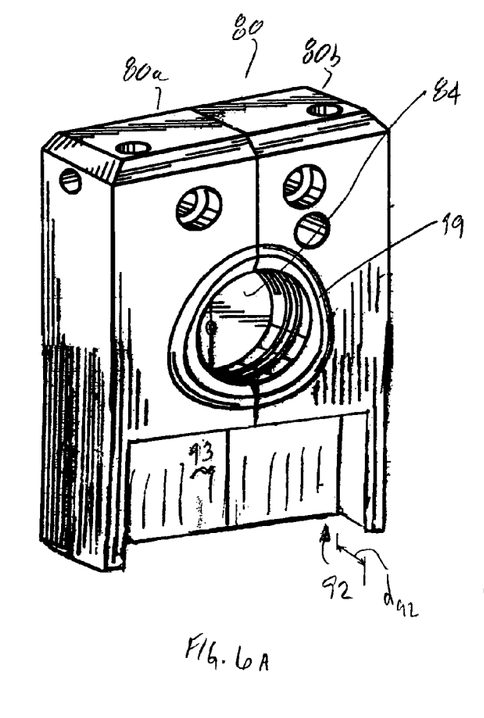
FIGS. 6A and 6B illustrate external and internal mold tools, respectively, for use with the carton blank of FIG. 1.
Figure 6B:
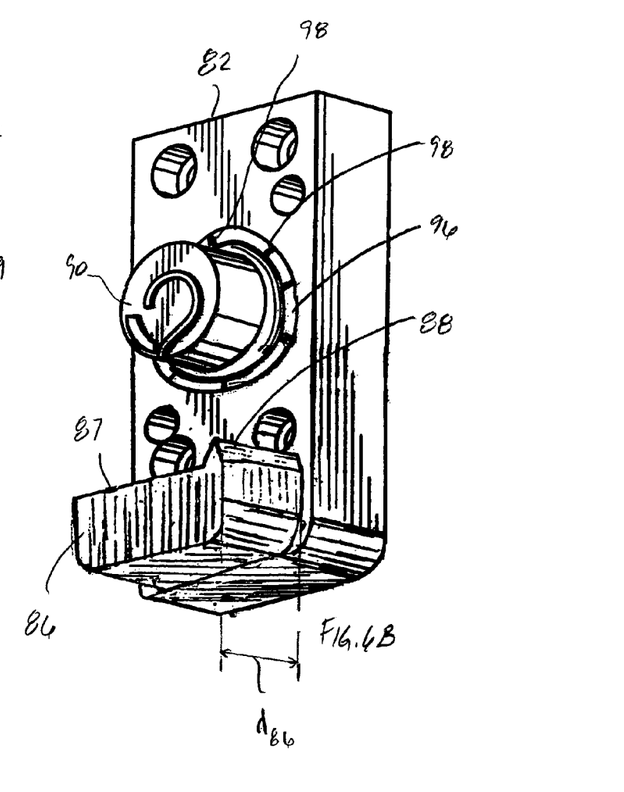
Figure 7:
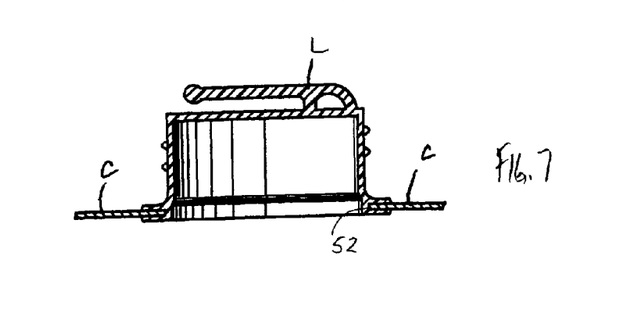
FIG. 7 is a cross-sectional illustration closure formed on a carton blank.

Referring now briefly to FIGS. 6A and 6B, external and internal tools 80, 82, respectively for use with the blank 10 are shown. The external tool 80 is formed in two portions 80a, 80b that mate with one another. As mated, the external tool portions 80a, 80b (referred to as tool 80 when mated) define a cavity 84 that defines the outside of the closure L (see FIG. 7).

The internal tool 82 includes a plug 90 that resides in the cavity 84 when the tools 80, 82 are mated with one another, and defines the interior of the closure L. The internal tool 82 further includes a stop wall 86, a stop surface 87 and an aligning projection 88. The stop wall 86 is configured for receipt in a recess 92 in the external tool 80. The wall 86 abuts the interior surface 93 of the recess 92 to position or space the internal and external tools 82, 80 from one another. That is, engagement of the wall 86 with the recess 92 (and recess wall 93) provides proper spacing between the tools 80, 82 for the carton blank material. The stop wall 86 thus stops relative movement of the tools 80, 82 to provide proper spacing for the carton blank material. In this manner, the space or gap between the mated tools 80, 82 (which also defines that mold cavity) is a precisely measured, gauged distance, that is dependent upon the distance $d_{86}$ that the wall 86 extends beyond the tool 82 surface in conjunction with the depth $d_{92}$ of the external tool recess 92.

The aligning projection 88, which in the illustrated embodiment is formed with, or as part of, the stop wall 86 and stop surface 87, has a predetermined, particular shape such that the projection 88 mates with the carton cut-out 68 to properly laterally position the carton between the mold tools 80, 82. It will be understood that the stop 86 and projection 88 need not be integrally formed as shown, nor positioned on the internal tool 82.

In use, the external tool portions 80a,b are mated with one another and the carton C is passed between the internal 82 and external tools 80. The carton C is positioned against the internal tool 82 such that the cut-out 68 aligns with the aligning projection 88 and the edge 76 of the fin panel 58 is positioned on (or against) the stop surface 87. The stop surface 87 thus prevents over insertion of the carton C; that is, the stop surface 87 provides for proper longitudinal positioning of the carton C between the tools 80, 82.

In the event that the carton C is slightly laterally askew, as the carton C comes down onto the aligning projection 88, contact between the cut-out edges 70, 72 and the (side) walls of the aligning projection 88 will reposition or urge the carton C into lateral position on the internal tool 82. The internal and external tools 82, 80 are then mated with one another with (with the carton C therebetween), and with the plug 90 positioned through the carton opening 52. Proper spacing between the tools 80, 82 is assured by contact of the stop wall 86 with the interior surface 93 of the recess 92. The tools 80, 82 are then locked to one another and plastic is injected into the cavity formed between the tools 80, 82 (around the carton C) to form the closure L. The edges of the opening 52 are encapsulated with the closure L plastic, as the closure L is formed.

In order to minimize deflection of the carton C material once it is in the mold and as plastic is injected into the mold cavity, paper control ribs 98 extend generally radially from about the base of the plug 90. In a present embodiment, a shallow well or channel 96 is formed around the base of the plug 90 in which the ribs 98 are formed. The ribs 98 support the paper to prevent localized deflection of the carton C. The ribs 98 also tend to improve contact between the flowing polymer and the carton (paper) material which enhances bonding. As seen in FIGS. 6A and 6B, a paper compression ring 99 is formed on the external tool 80 for engaging and compressing the paperboard against the internal tool 82, outside of the well 96. This forms the boundary to which the polymer flows during closure L molding. Those skilled in the art will appreciate that (even though not shown) the paper compression ring can alternately be formed on the internal tool. When the internal and external tools 82, 80 are closed and secured, the paper compression ring 99 is about 0.35 mm from the internal tool to compress the paper to about 0.35 mm from about 0.5 mm.

Figure 2A:
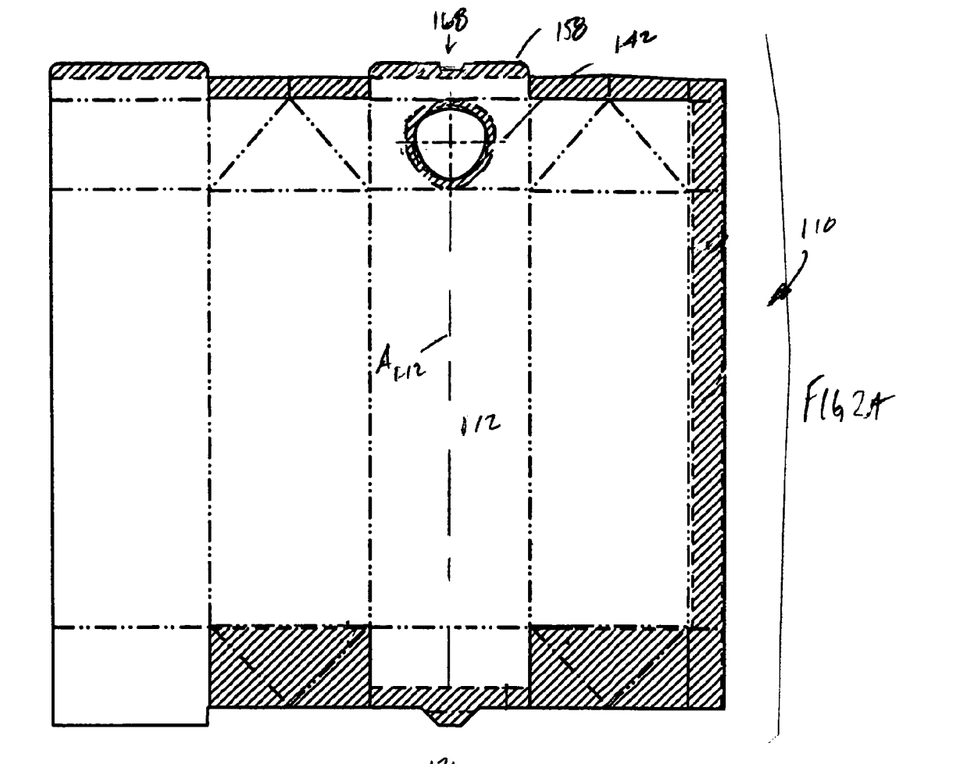
FIG. 2A is a plan view of an alternate embodiment of a direct injection molded closure carton blank.
Figure 2B:
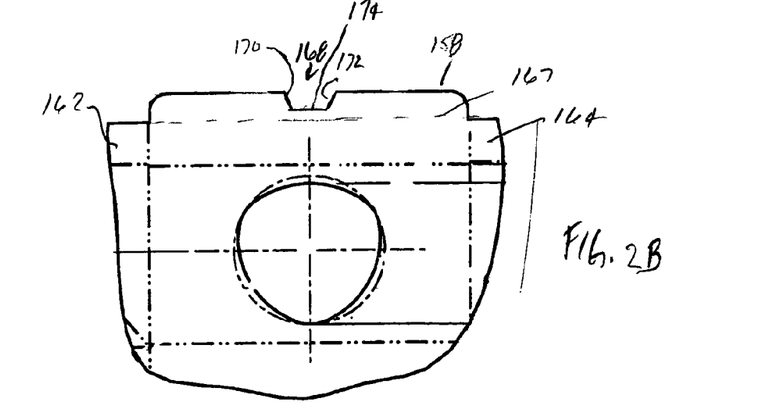
FIG. 2B is an enlarged view of the closure panel of the blank of FIG. 2A.
Figure 2C:
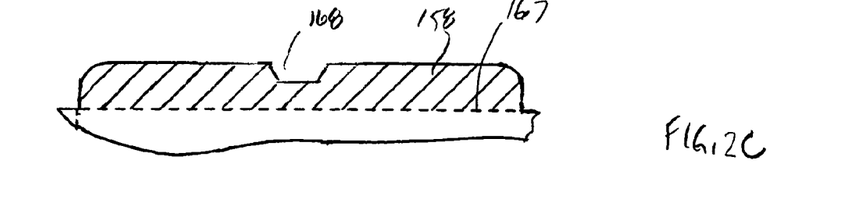
FIG. 2C is still further enlarged view of the fin portion of the panel of FIG. 2B.
Figure 3A:
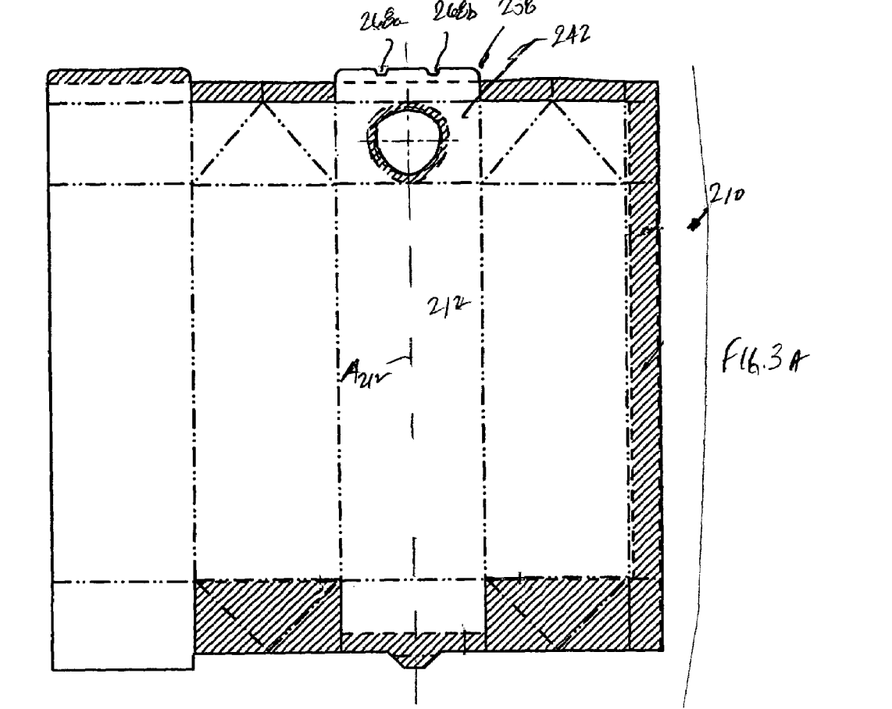
FIG. 3A is a plan view of an another alternate embodiment of a direct injection molded closure carton blank.
Figure 3B:
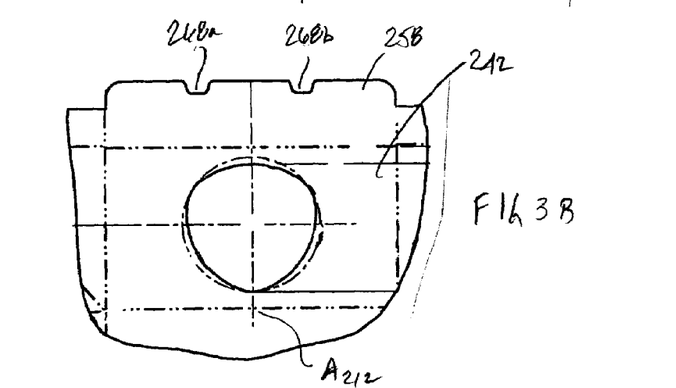
FIG. 3B is an enlarged view of the closure panel of the blank of FIG. 3A.
Figure 4:
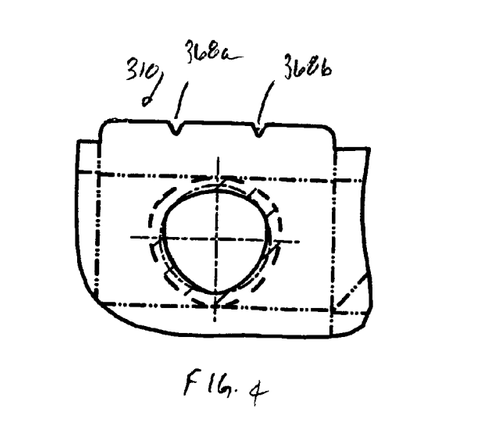
FIGS. 4 and 5 are closure panels illustrating portions of still other embodiments of blanks.

FIGS. 2A-5 illustrate alternate embodiments of the carton blank 110, 210, 310, 410. In FIGS. 2A-2C, the fin panel 158 includes one centrally disposed cut-out 168 that lies along the longitudinal centerline $A_{112}$ of panels 112, 142, 158. The cut-out 168 includes tapered or inclined walls 170, 172 that terminate at a flat base wall 174. The base wall 174 does not extend so far as the uppermost edges of adjacent panels 162, 164 (as indicated by phantom line 167). FIGS. 3A-3B illustrate a blank 210 having a fin panel 258 with a two, mirror-image cut-outs 268a,b that have the flat bottom profile. FIG. 4 illustrates an embodiment of the carton blank 310 having a pair of V-shaped cut-outs 368a, 368b.

Figure 5:
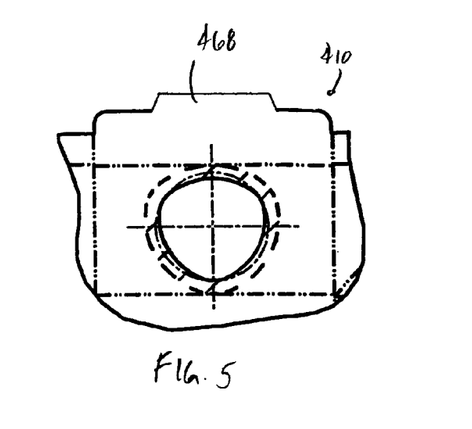

FIG. 5 illustrates yet another embodiment of the blank 410 that includes a projecting tab 468 instead of the cut-outs. The tab 468 is configured to cooperate with a mating notch (not shown) in the stop surface (which can be formed in the internal or external tools) much that same way that the cut-outs and projections cooperate to prevent lateral movement of the carton relative to the tools 80, 82.

Although the carton cut-outs and tool aligning projections are shown having a triangular (wedge) or flat, truncated shape, it will be appreciated by those skilled in the art that other shapes, such as semicircular or arcuate shapes and the like, as well as plural or other shapes, e.g., pairs of spaced apart projections, can be used, which shapes and configurations, as well as other shapes and configurations, are within the scope and spirit of the present invention.

All patents referred to herein, are hereby incorporated herein by reference, whether or not specifically done so within the text of this disclosure.

From the foregoing it will be observed that numerous modifications and variations can be effectuated without departing from the true spirit and scope of the novel concepts of the present invention. It is to be understood that no limitation with respect to the specific embodiments illustrated is intended or should be inferred. The disclosure is intended to cover by the appended claims all such modifications as fall within the scope of the claims.

What is claimed is:

1. In combination, a form, fill and seal packaging machine and a carton blank for use therein, comprising:

the form, fill, and seal packaging machine for forming, filling, and sealing a carton, the machine configured to mold a closure directly onto the carton, the machine including a tool set having first and second tool elements, the first tool element having an aligning member extending therefrom in a direction transverse to a direction of loading the carton between the first and second tool elements, the aligning member having a predetermined shape having diverging surfaces; and the carton blank having a rear wall panel, a first side wall panel, a front wall panel, and a second side wall panel, each panel separated from its adjacent panels by a vertical score line, a closure panel adjacent the front wall panel, the closure panel partitioned from the front wall panel by a first horizontal score line, the closure panel having a closure panel fin panel extending from a side opposite the front wall panel, the closure panel fin panel having a height measured to an edge of the fin panel, the closure panel configured for having a closure molded thereon and a first upper side panel adjacent the first side wall panel, the first upper side panel being adjacent the closure panel, the first upper side panel having a first upper side panel fin panel having a height, a second upper side panel adjacent the second side wall panel, the second upper side panel being adjacent the closure panel, the second upper side panel having a second upper side panel fin panel having a height and a rear upper panel adjacent the rear wall panel, the rear upper panel being adjacent the first and second upper side panels, the rear upper panel having a rear upper panel fin panel having a height, wherein the closure panel fin panel has at least one cut-out formed therein, the cut-out having converging edges and a shape complementary to the first tool element aligning member and configured to mate with the first tool element aligning member to laterally align the carton with the first tool, and wherein the closure panel has an opening therein about which the closure is formed when the carton is aligned.

2. The combination in accordance with claim 1 wherein the at least one cut-out has a depth that is less than a difference between the closure panel fin panel height and the first upper side panel fin panel height.

3. The combination in accordance with claim 1 wherein the fin panel has a plurality of cut-outs formed therein, at least one of the cut-outs configured to mate with an aligning member on the external tool.

4. The combination in accordance with claim 1 wherein the at least one cut-out has opposing converging edges and a base portion inward of the edge of the closure panel fin panel.

5. The combination in accordance with claim 4 wherein the edges and base portion define a V-shape.

6. The combination in accordance with claim 4 wherein the sides are straight and wherein the base portion is straight, extending between the sides, the base portion being parallel to the edge of the closure panel fin panel.

7. The combination in accordance with claim 1 wherein the at least one cut-out is laterally off center of the closure panel fin panel.

8. The combination in accordance with claim 1 wherein the at least one cut-out is laterally centered on the closure panel fin panel.

9. The combination in accordance with claim 1 wherein the second side wall panel is adjacent the front wall panel, on a side opposite the first side wall panel and wherein the rear wall panel is adjacent the second side wall panel, opposite the front wall panel, the blank including a sealing panel adjacent the first side wall panel, opposite the front wall panel.

10. In combination, a form, fill and seal packaging machine and a carton blank for use therein, comprising:

the form, fill, and seal packaging machine for forming, filling, and sealing a carton, the machine configured to mold a closure directly onto the carton, the machine including a tool set having first and second tool elements, the first tool element having an aligning member extending therefrom in a direction transverse to a direction of loading the carton between the first and second tool elements, the aligning member having a predetermined shape having diverging surfaces, the carton blank having a rear wall panel, a first side wall panel, a front wall panel, and a second side wall panel, each panel separated from its adjacent panels by a vertical score line, a closure panel adjacent the front wall panel, the closure panel partitioned from the front wall panel by a first horizontal score line, the closure panel having a closure panel fin panel extending from a side opposite the front wall panel, the closure panel fin panel having a height measured to an edge of the fin panel, the closure panel configured for having a closure molded thereon, a first upper side panel adjacent the first side wall panel, the upper side panel being adjacent the closure panel, the first upper side panel having a first upper side panel fin panel having a height, a second upper side panel adjacent the second side wall panel, the second upper side panel being adjacent the closure panel, the second upper side panel having a second upper side panel fin panel having a height, a rear upper panel adjacent the rear wall panel, the rear upper panel being adjacent the first and second upper side panels, the rear upper panel having a rear upper panel fin panel having a height and means, located on only the closure fin panel, for laterally aligning the carton with the first tool, and wherein the closure panel has an opening therein about which the closure is formed when the carton is aligned.

11. The combination in accordance with claim 10 including means for longitudinally aligning the carton with the first tool.

12. The combination in accordance with claim 11 wherein the means for laterally aligning the carton and the means for longitudinally aligning the carton are integral with one another.

13. In combination, a form, fill and seal packaging machine and a carton blank for use therein, comprising:

the form, fill and seal packaging machine for forming, filling and sealing a carton, the machine configured to mold a closure directly onto the carton, the machine including a tool set having first and second tool elements, the first tool element having a stop surface extending therefrom for preventing over-insertion of the carton in a direction of loading the carton between the first and second tool elements and including an aligning member formed in the stop surface, the aligning member having a predetermined shape, the carton blank having a rear wall panel, a first side wall panel, a front wall panel and a second side wall panel, each panel separated from its adjacent panels by a vertical score line, a closure panel adjacent the front wall panel, the closure panel partitioned from the front wall panel by a first horizontal score line, the closure panel having a closure panel fin panel extending from a side opposite the front wall panel, the closure panel fin panel having a height measured to an edge of the fin panel, the closure panel configured for having a closure molded thereon, a first upper side panel adjacent the first side wall panel, the upper side panel being adjacent the closure panel, the first upper side panel having a first upper side panel fin panel having a height, the closure panel fin panel having a differentiable formation therein for mating with the first tool element aligning member to laterally align the carton with the first tool element as the carton contacts the stop surface and is longitudinally positioned relative to the first tool element by engagement with the stop surface carton, and wherein the closure panel has an opening therein about which the closure is formed when the carton is aligned.

14. The combination in accordance with claim 13 wherein the closure panel fin panel formation is a cut-out.

* * * * *

UNITED STATES PATENT AND TRADEMARK OFFICE
CERTIFICATE OF CORRECTION

PATENT NO. : 7,571,846 B2  Page 1 of 1
APPLICATION NO. : 10/894767
DATED : August 11, 2009
INVENTOR(S) : Berglin et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1182 days.

Signed and Sealed this

Seventh Day of September, 2010

David J. Kappos
*Director of the United States Patent and Trademark Office*